US012017455B2

(12) United States Patent
Mizuno

(10) Patent No.: US 12,017,455 B2
(45) Date of Patent: Jun. 25, 2024

(54) LIQUID DISCHARGE HEAD

(71) Applicant: BROTHER KOGYO KABUSHIKI KAISHA, Nagoya (JP)

(72) Inventor: Taisuke Mizuno, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 114 days.

(21) Appl. No.: 18/049,312

(22) Filed: Oct. 25, 2022

(65) Prior Publication Data

US 2023/0166504 A1 Jun. 1, 2023

(30) Foreign Application Priority Data

Nov. 26, 2021 (JP) ................................ 2021-192047

(51) Int. Cl.
*B41J 2/14* (2006.01)

(52) U.S. Cl.
CPC ................................ *B41J 2/14209* (2013.01)

(58) Field of Classification Search
CPC ............... B41J 2/14209; B41J 2002/03; B41J 2002/14225; B41J 2002/14459
See application file for complete search history.

(56) References Cited

U.S. PATENT DOCUMENTS

| | | | | |
|---|---|---|---|---|
| 9,199,459 | B2 * | 12/2015 | Suzuki | H10N 30/2047 |
| 2003/0103115 | A1 | 6/2003 | Watanabe et al. | |
| 2007/0176978 | A1 * | 8/2007 | Sugahara | B41J 2/04581 347/68 |
| 2010/0223768 | A1 | 9/2010 | Sekiguchi et al. | |
| 2015/0035906 | A1 * | 2/2015 | Mizuno | B41J 2/14209 347/50 |

FOREIGN PATENT DOCUMENTS

| | | |
|---|---|---|
| JP | 2003165214 A | 6/2003 |
| JP | 2010201849 A | 9/2010 |

* cited by examiner

*Primary Examiner* — Anh T Vo
(74) *Attorney, Agent, or Firm* — Scully, Scott, Murphy & Presser, PC

(57) ABSTRACT

A liquid discharge head is provided, including a channel unit and a piezoelectric actuator stacked on the channel unit. The channel includes a channel including a nozzle and a pressure chamber. The piezoelectric actuator includes a piezoelectric element which includes a piezoelectric layer; a constant electric potential electrode arranged between the piezoelectric layer and the channel unit; and a driving electrode arranged on a surface of the piezoelectric layer opposite to the constant electric potential electrode. A relational expression of $0.5107\alpha+18.476<\beta<0.7326\alpha+54.409$ is fulfilled assuming that $\alpha$ represents a length in a transverse direction orthogonal to both of one direction and a stacking direction of the pressure chamber and $\beta$ represents a length in the transverse direction of the driving electrode.

10 Claims, 5 Drawing Sheets

LIQUID DISCHARGE HEAD

REFERENCE TO RELATED APPLICATIONS

This application claims priority from Japanese Patent Application No. 2021-192047 filed on Nov. 26, 2021. The entire content of the priority application is incorporated herein by reference.

BACKGROUND ART

Conventionally, an ink-jet head (liquid discharge head) is known, which is provided with a channel unit and a piezoelectric actuator. The channel unit is formed with channels including a plurality of nozzles and a plurality of pressure chambers which are communicated with the plurality of nozzles respectively. The piezoelectric actuator is stacked on the channel unit so that the plurality of pressure chambers are covered therewith. The piezoelectric actuator is provided with a plurality of piezoelectric sheets which are mutually stacked, a first constant electric potential electrode and a second constant electric potential electrode (constant electric potential electrode) which are provided commonly with respect to the plurality of pressure chambers, and individual electrodes (driving electrodes) which are provided individually with respect to the plurality of pressure chambers and each of which is overlapped with the corresponding pressure chamber in relation to the stacking direction of the channel unit and the piezoelectric actuator.

A portion (piezoelectric element) of the piezoelectric actuator, which is overlapped in the stacking direction with each of the plurality of pressure chambers, is deformed in the stacking direction by generating the electric potential difference between the two electrodes (the constant electric potential electrode and the driving electrode) which are arranged while interposing the piezoelectric sheets in the stacking direction. Accordingly, the pressure of the ink contained in the pressure chamber can be fluctuated so that the ink can be discharged from the nozzle communicated with the pressure chamber.

DESCRIPTION

In order to miniaturize the apparatus of the liquid discharge head as described above, it is necessary to decrease the area (square measure) of the driving electrode. However, if the area of the driving electrode is decreased, the displacement amount of the piezoelectric element is lowered in the piezoelectric actuator. If the displacement amount of the piezoelectric actuator is lowered, a problem arises such that the discharge speed and the discharge amount of the ink discharged from the nozzle are lowered.

An object of the present disclosure is to provide a liquid discharge head which can be miniaturized and which contributes to the suppression of the decrease in the displacement amount of the piezoelectric actuator.

According to an aspect of present disclosure, there is provided a liquid discharge head including a channel unit including a channel including a nozzle and a pressure chamber communicated with the nozzle; and a piezoelectric actuator which is stacked on the channel unit. The piezoelectric actuator is arranged at a portion overlapped with the pressure chamber in a stacking direction of the channel unit and the piezoelectric actuator. The piezoelectric actuator has a piezoelectric element for applying a pressure to a liquid contained in the pressure chambers. The piezoelectric element includes a piezoelectric layer; a constant electric potential electrode which is arranged between the piezoelectric layer and the channel unit; and a driving electrode which is arranged on a surface of the piezoelectric layer opposite to the constant electric potential electrode and which is selectively applied with a first electric potential and a second electric potential that is higher than the first electric potential. The constant electric potential electrode is maintained at a third electric potential which is not less than the first electric potential and which is not more than the second electric potential. The pressure chamber and the driving electrode have shapes which are elongated in one direction orthogonal to the stacking direction respectively. A relational expression of $0.5107\alpha+18.476<\beta<0.7326\alpha+54.409$ is fulfilled assuming that $\alpha$ represents a length in a transverse direction orthogonal to both of the one direction and the stacking direction of the pressure chamber and $\beta$ represents a length in the transverse direction of the driving electrode.

According to another aspect of the present disclosure, there is provided a liquid discharge head including a channel unit including a channel including a nozzle and a pressure chamber communicated with the nozzle; and a piezoelectric actuator stacked on the channel unit. The piezoelectric actuator is arranged at a portion overlapped with the pressure chamber in relation to a stacking direction of the channel unit and the piezoelectric actuator. The piezoelectric actuator has a piezoelectric element for applying a pressure to a liquid contained in the pressure chamber. The piezoelectric element includes a piezoelectric layer; a driving electrode which is arranged between the piezoelectric layer and the channel unit and which is selectively applied with a first electric potential and a second electric potential that is higher than the first electric potential; and a constant electric potential electrode which is arranged on a surface of the piezoelectric layer opposite to the driving electrode. The constant electric potential electrode is maintained at a third electric potential which is not less than the first electric potential and which is not more than the second electric potential. The pressure chamber and the driving electrode have shapes which are long in one direction orthogonal to the stacking direction respectively. A relational expression of $0.5107\alpha+18.476<\beta<0.7326\alpha+54.409$ is fulfilled assuming that $\alpha$ represents a length in a transverse direction orthogonal to both of the one direction and the stacking direction of the pressure chamber and $\beta$ represents a length in the transverse direction of the driving electrode.

As a result of various experiments and diligent investigations repeated by the present inventors, it has been found out that the displacement amount of the piezoelectric element changes depending on the width of the pressure chamber (length in the transverse direction) and the width of the driving electrode (length in the transverse direction). According to the liquid discharge head of the present disclosure, as clarified from simulation results described later on, the width of the pressure chamber and the width of the driving electrode are in such a relationship that the displacement amount of the piezoelectric element can be sufficiently increased. Therefore, it is possible to define the size or dimension which makes it possible to sufficiently increase the displacement amount of the piezoelectric element without excessively decreasing or excessively increasing the width of the driving electrode with respect to the width of the pressure chamber. Accordingly, the liquid discharge head of the present disclosure can contribute to the miniaturization of the apparatus by decreasing the area (square measure) of the driving electrode. Further, the liquid discharge head of the present disclosure can contribute to the suppression of the decrease in the displacement amount of the piezoelectric element.

FIRST EMBODIMENT

A preferred first embodiment of the present disclosure will be explained below with reference to FIG. 1.

<Overall Configuration of Printer>

Figure 1:
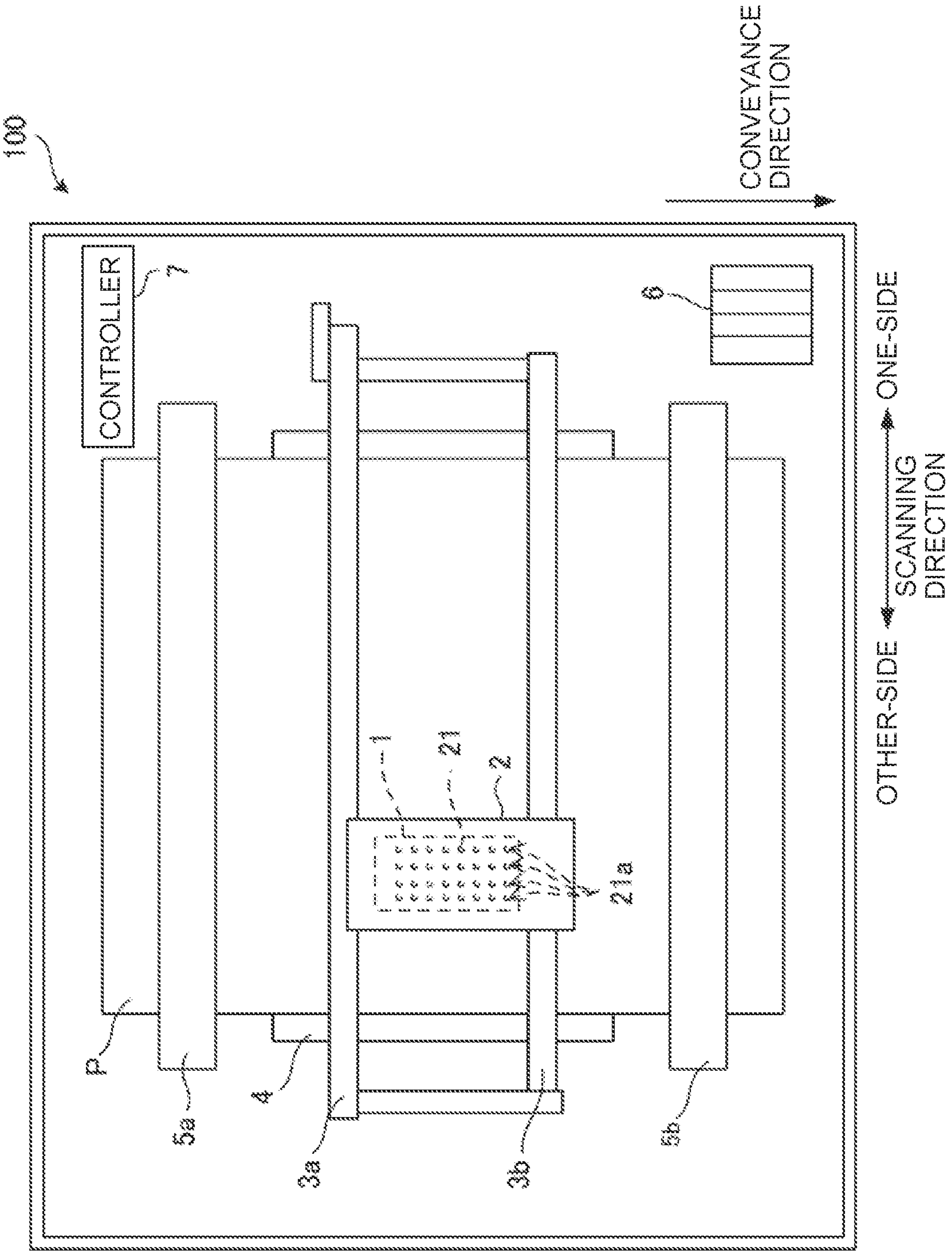
FIG. 1 is a plan view of a printer provided with an ink-jet head 1.

As depicted in FIG. 1, a printer 100 according to this embodiment is provided with an ink-jet head 1 (example of the "liquid discharge head" of the present disclosure), a carriage 2, guide rails 3*a*, 3*b*, a platen 4, conveying rollers 5*a*, 5*b*, an ink tank 6, and a controller 7.

The carriage 2 is supported by the two guide rails 3*a*, 3*b* which extend in the scanning direction (left-right direction as viewed in FIG. 1) along with the horizontal direction, and the carriage 2 is movable in the scanning direction along the guide rails 3*a*, 3*b*. The ink-jet head 1 is carried on the carriage 2, and the ink-jet head 1 is movable in the scanning direction together with the carriage 2. In the following explanation, the right side as viewed in FIG. 1 in the scanning direction is referred to as "one-side", and the left side as viewed in FIG. 1 is referred to as "other side". Further, the direction (direction directed from the upward to the downward as viewed in FIG. 1) orthogonal to the scanning direction as viewed in FIG. 1 is referred to as "conveyance direction", and the direction perpendicular to the paper surface is referred to as "up-down direction".

Four color inks of black, yellow, cyan, and magenta are supplied via tubes (not depicted) from the ink tank 6 to the ink-jet head 1. The ink-jet head 1 discharges the inks from a plurality of nozzles 21 which are open on a nozzle surface 11*y* (see FIG. 4) as the lower surface thereof.

The plurality of nozzles 21 form nozzle arrays 21*a* disposed in the conveyance direction. The ink-jet head 1 has the four nozzle arrays 21*a* which are aligned in the scanning direction. The inks of black, yellow, cyan, and magenta are discharged from the plurality of nozzles 21 as referred to in an order starting from those constitute the nozzle array 21*a* positioned at the rightmost position in the scanning direction as viewed in FIG. 1. Note that the configuration of the ink-jet head 1 will be explained in detail later on.

The platen 4 is arranged opposingly to the nozzle surface 11*y* (see FIG. 4) which is the lower surface of the ink-jet head 1. The platen 4 extends over the entire length of the recording paper P in the scanning direction. The platen 4 supports the recording paper P from the lower position. The conveying rollers 5*a*, 5*b* are arranged on the upstream side and the downstream side from the carriage 2 in the conveyance direction respectively, and the conveying rollers 5*a*, 5*b* convey the recording paper P in the conveyance direction.

The controller 7 is provided with, for example, ROM (Read Only Memory), RAM (Random Access Memory), and ASIC (Application Specific Integrated Circuit) including various control circuits. For example, a motor (not depicted) for moving the carriage 2, a motor (not depicted) for rotating the conveying rollers 5*a*, 5*b*, and driver IC 71 (see FIG. 4) described later on are electrically connected to the controller 7. ASIC of the controller 7 executes various processes concerning the action or operation of the printer 100, including, for example, the printing process for the recording paper P. For example, in the printing process, an ink discharging action for discharging the inks while moving the ink-jet head 1 in the scanning direction together with the carriage 2 and a conveyance action for conveying the recording paper P by a predetermined amount in the conveyance direction by means of the conveying rollers 5*a*, 5*b* are alternately performed.

<Ink-Jet Head 1>

Figure 2:
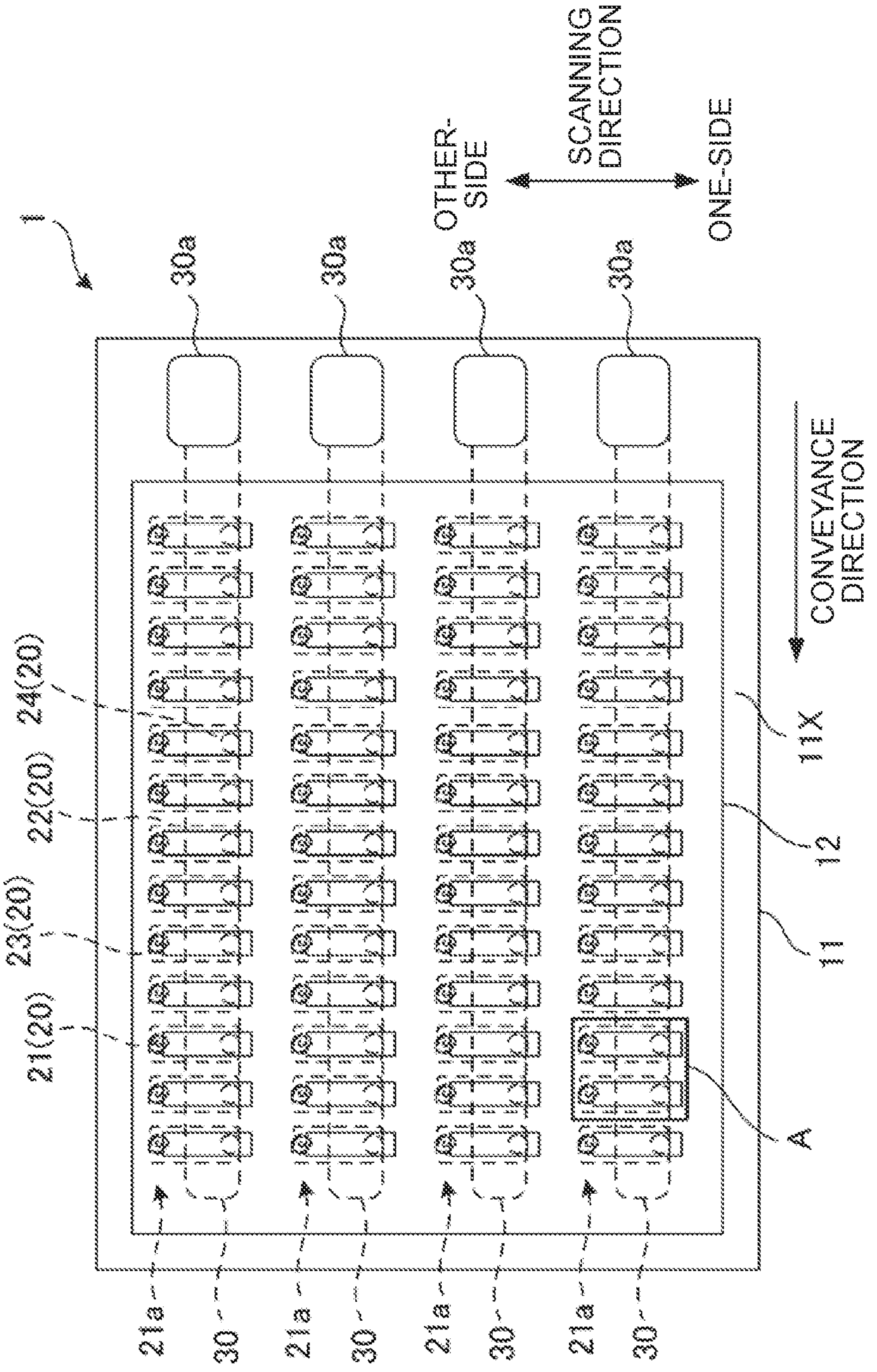
FIG. 2 is a plan view of the ink-jet head 1 depicted in FIG. 1.

Next, the configuration of the ink-jet head 1 will be explained in detail with further reference to FIG. 2 to FIG. 5. As depicted in FIG. 2, the ink-jet head 1 has a rectangular or oblong shape which is lengthy in the conveyance direction as viewed in a top view. The ink-jet head 1 is provided with, for example, a channel unit 11 and a piezoelectric actuator 12.

<Channel Unit 11>

Figure 4:
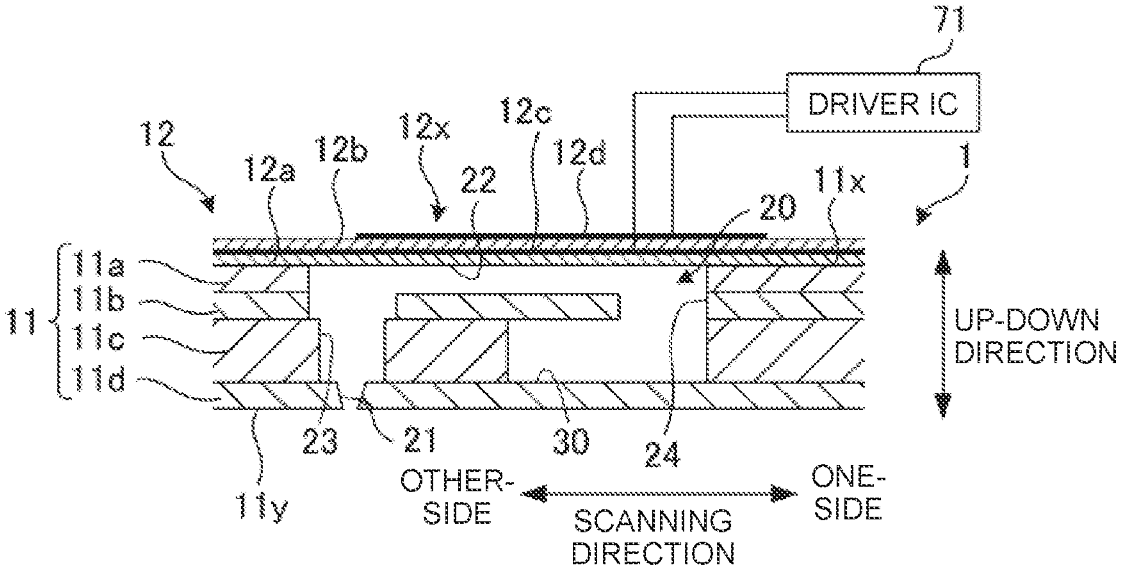
FIG. 4 is a sectional view taken along a line IV-IV depicted in FIG. 3.
Figure 5:
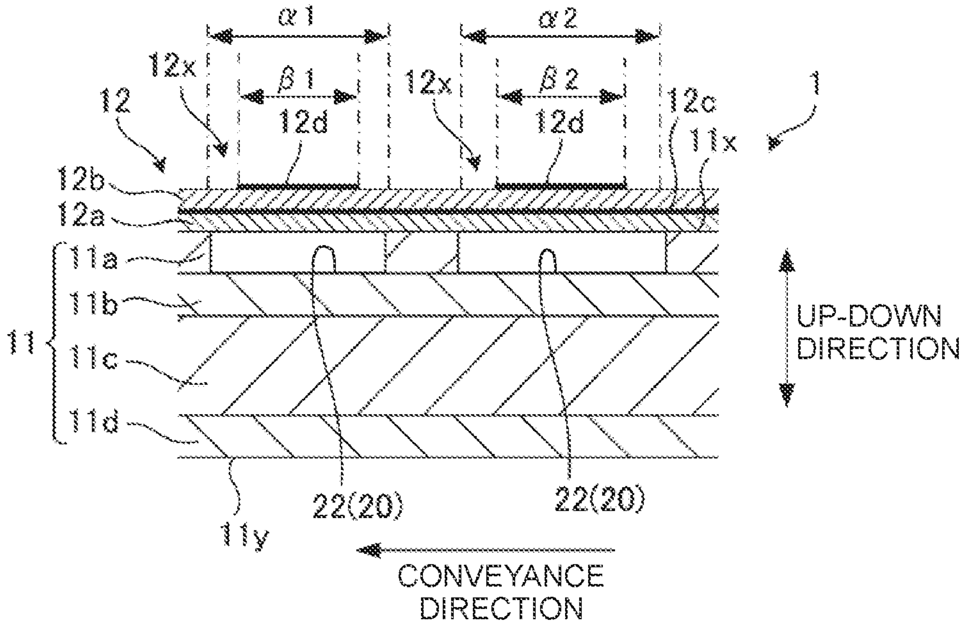
FIG. 5 is a sectional view taken along a line V-V depicted in FIG. 3.

As depicted in FIG. 4 and FIG. 5, the channel unit 11 is composed of four plates 11*a* to 11*d* which are stacked in the up-down direction and which are adhered to one another. The plates 11*a* to 11*d* are aligned in this order in the direction directed from the upward to the downward. A plurality of individual channels 20 and manifolds 30 are formed in the channel unit 11. Through-holes, which constitute the individual channels 20 and the manifolds 30, are formed through the respective plates 11*a* to 11*d*.

As depicted in FIG. 2, the channel unit 11 is formed with the four manifolds 30 each of which extends in the conveyance direction and which are separated from each other in the scanning direction. The four manifolds 30 correspond to the inks of black, yellow, cyan, and magenta respectively. The manifolds 30 are communicated with the ink tank 6 via supply ports 30*a* which are provided at end portions on the upstream side in the conveyance direction. The supply ports 30*a* are open on the upper surface 11*x* of the channel unit 11. As depicted in FIG. 4, the manifolds 30 are configured by the through-holes formed through the plate 11*c*.

As depicted in FIG. 4, the plurality of individual channels 20 have the nozzles 21 respectively. Each of the manifolds 30 is provided commonly to the plurality of individual channels 20 corresponding to the plurality of nozzles 21 for constructing one nozzle array 21*a*. The ink, which is contained in the ink tank 6, is fed from the supply port 30*a* to the manifold 30. The ink, which is fed to the manifold 30, is supplied to the respective individual channels 20, while being moved from the upstream side to the downstream side in the conveyance direction in the manifold 30, and the ink is discharged from the nozzles 21.

As depicted in FIG. 4, each of the individual channels 20 includes the nozzle 21, a pressure chamber 22, a connecting channel 23, and a communication hole 24. As depicted in FIG. 2, the nozzle array 21*a*, which is composed of the nozzles 21 possessed by the plurality of individual channels 20 provided for each of the manifolds 20, is positioned on the other side of the manifold 30 in relation to the scanning direction.

Figure 3:
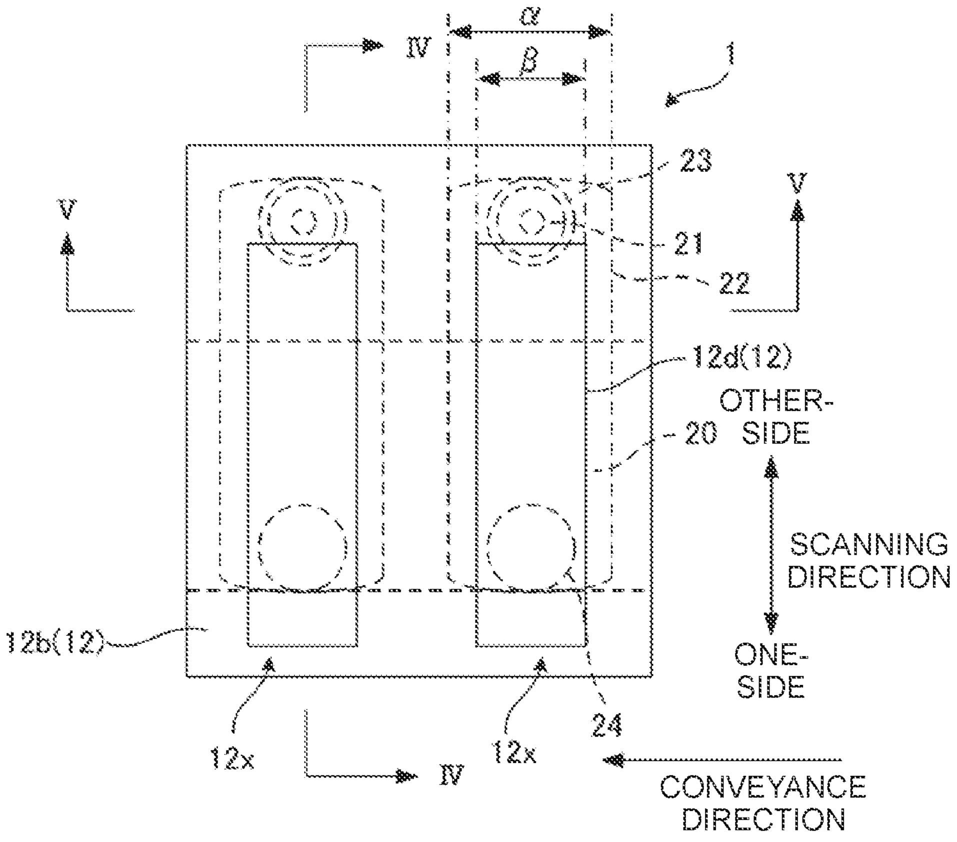
FIG. 3 is an enlarged view of an area depicted by A in FIG. 2.

As depicted in FIG. 4, the nozzle 21 is constructed by the through-hole formed through the plate 11*d*, and the nozzle 21 is open on the nozzle surface 11*y* as the lower surface of the channel unit 11. The pressure chamber 22 is constructed by the through-hole formed through the plate 11*a*, and the pressure chamber 22 is open on the upper surface 11*x* of the channel unit 11. As depicted in FIG. 3, the pressure chamber 22 has a substantially rectangular or oblong shape which is lengthy in the scanning direction as viewed in a top view. That is, the plurality of pressure chambers 22, which belong to one nozzle array 21*a*, are aligned in the transverse direction (conveyance direction) thereof. As depicted in FIG. 4, the connecting channel 23 is connected to the end portion of the pressure chamber 22 disposed on the other side in the scanning direction, and the pressure chamber 22 is communicated with the nozzle 21 via the connecting channel 23. Further, the communication hole 24 is connected to the end portion of the pressure chamber 22 disposed on one-side in the scanning direction, and the pressure chamber 22 is communicated with the manifold 30 via the communication hole 24.

The connecting channel 23 mutually connects the nozzle 21 and the pressure chamber 22. The connecting channel 23 is constructed by the through-holes formed through the plate 11*b* and the plate 11*c* respectively. The communication hole 24 mutually connects the manifold 30 and the pressure chamber 22. The communication hole 24 is constructed by the through-hole formed through the plate 11*b*.

The ink, which is supplied from the manifold 30 to the individual channel 20, passes through the communication hole 24, and the ink flows into the pressure chamber 22. The ink moves substantially horizontally in the pressure chamber 22, and then the ink flows into the connecting channel 23. The ink, which flows into the connecting channel 23, moves downwardly, and the ink is discharged from the nozzle 21.

<Piezoelectric Actuator 12>

The piezoelectric actuator 12 is stacked on the upper surface 11*x* of the channel unit 11. As depicted in FIG. 4 and FIG. 5, the piezoelectric actuator 12 includes a vibration plate 12*a*, a piezoelectric layer 12*b*, a common electrode 12*c*, and a plurality of individual electrodes 12*d*.

The vibration plate 12*a* is arranged on the upper surface 11*x* of the channel unit 11 so that the vibration plate 12*a* ranges over the plurality of pressure chambers 22. In this embodiment, the vibration plate 12*a* is formed of, for example, a piezoelectric material containing a main component of lead titanate zirconate or the like. The vibration plate 12*a* may be formed of any material other than the piezoelectric material, including, for example, a synthetic resin material and a metal material such as stainless steel or the like.

The piezoelectric layer 12*b* is stacked on the surface (upper surface) of the vibration plate 12*a* disposed on the side opposite to the side of the channel unit 11. The piezoelectric layer 12*b* is an example of the "piezoelectric layer" of the present disclosure. The piezoelectric layer 12*b* is arranged so that the piezoelectric layer 12*b* ranges over the plurality of pressure chambers 22. The piezoelectric layer 12*b* is composed of, for example, a piezoelectric material containing a main component of lead titanate zirconate or the like.

The common electrode 12*c* is arranged on the surface (lower surface) of the piezoelectric layer 12*b* disposed on the side of the channel unit 11. In other words, the common electrode 12*c* is arranged between the vibration plate 12*a* and the piezoelectric layer 12*b*. The common electrode 12*c* is arranged so that the common electrode 12*c* ranges over the plurality of pressure chambers 22. The plurality of individual electrodes 12*d* are arranged on the surface (upper surface) of the piezoelectric layer 12*b* disposed on the side opposite to the side of the common electrode 12*c*. The plurality of individual electrodes 12*d* are provided individually for the plurality of pressure chambers 22. As depicted in FIG. 3, the individual electrode 12*d* has a rectangular or oblong shape which is lengthy in the scanning direction as viewed in a top view. The center in the transverse direction (conveyance direction) of the individual electrode 12*d* is coincident with the center in the transverse direction (conveyance direction) of the pressure chamber 22. The individual electrode 12*c* is overlapped in the up-down direction with the corresponding pressure chamber 22 except for the end portion disposed on one-side in the scanning direction.

The common electrode 12*c* and the plurality of individual electrodes 12*d* are electrically connected to the driver IC 71. The driver IC 71 maintains the electric potential of the common electrode 12*c* at the ground electric potential (0 V: "third electric potential" of the present disclosure). Further, the driver IC 71 selectively applies, to the plurality of individual electrodes 12*d* individually, any one of the ground electric potential (0 V: example of the "first electric potential" of the present disclosure) and a predetermined driving electric potential (for example, 20 V: example of the "second electric potential" of the present disclosure) which is higher than the ground electric potential. Specifically, the driver IC 71 generates the driving signal on the basis of the control signal supplied from the controller 7, and the driver IC 71 supplies the driving signal to the individual electrode 12*d*. Accordingly, the electric potential of the individual electrode 12*d* changes between the ground electric potential and the driving electric potential. That is, the common electrode 12*c* is an example of the "constant electric potential electrode" of the present disclosure, and the individual electrode 12*d* is an example of the "driving electrode" of the present disclosure.

Each of the portions of the piezoelectric layer 12*b*, which is interposed by the common electrode 12*c* and each of the individual electrodes 12*d*, is polarized in the downward direction. Then, in the piezoelectric actuator 12, each of the portions of the vibration plate 12*a*, the piezoelectric layer 12*b*, and the common electrode 12*c* overlapped in the up-down direction with each of the pressure chambers 22 and each of the portions formed by the individual electrodes 12*d* form the piezoelectric element 12X for applying the pressure to the ink contained in the pressure chamber 22. That is, the piezoelectric elements 12X are provided individually for the plurality of pressure chambers 22.

In this configuration, when the electric potential of the individual electrode 12*d* is switched from the ground electric potential to the driving electric potential in each of the piezoelectric elements 12X of the piezoelectric actuator 12, the electric field, which is directed in the downward direction that is the same as the polarization direction, is generated in the portion of the piezoelectric layer 12*b* interposed by these electrodes by means of the electric potential difference between the individual electrode 12*d* and the common electrode 12*c*. In accordance with the electric field, the foregoing portion of the piezoelectric layer 12*b* is shrunk in the horizontal direction, and the piezoelectric element 12X is deformed so that the piezoelectric element 12X protrudes toward the pressure chamber 22.

Further, when the electric potential of the individual electrode 12*d* is switched from the driving electric potential to the ground, then the individual electrode 12*d* and the common electrode 12*c* have the same electric potential, and the piezoelectric element 12X returns to the state having been provided before the deformation. Then, in accordance with the deformation of the piezoelectric element 12X provided when the electric potential of the individual electrode 12*d* is switched between the ground and the driving electric potential, the volume in the pressure chamber 22 is changed, the pressure is applied to the ink contained in the pressure chamber 22, and the ink is discharged from the nozzle 21 communicated with the pressure chamber 22.

The width α of the pressure chamber 22 and the width β of the individual electrode 12*d* are defined as follows (see FIG. 3). The width α of the pressure chamber 22 is the length in the transverse direction of the pressure chamber 22. As described above, the pressure chamber 22 has the substantially rectangular or oblong shape which is lengthy in the scanning direction as viewed in a top view. Therefore, the width α of the pressure chamber 22 is the distance between the pair of parallel long sides extending in the scanning direction of the pressure chamber 22. Further, the width β of the individual electrode 12*d* is the length in the transverse direction of the individual electrode 12*d*. As described above, the individual electrode 12*d* has the rectangular or oblong shape which is lengthy in the scanning direction as viewed in a top view. Therefore, the width β of the individual electrode 12*d* is the distance between the pair of parallel long sides extending in the scanning direction of the individual electrode 12*d*. In this embodiment, the width α of the pressure chamber 22 and the width β of the individual electrode 12*d* have the relationship of Expression 1 as described later on.

Figure 6:
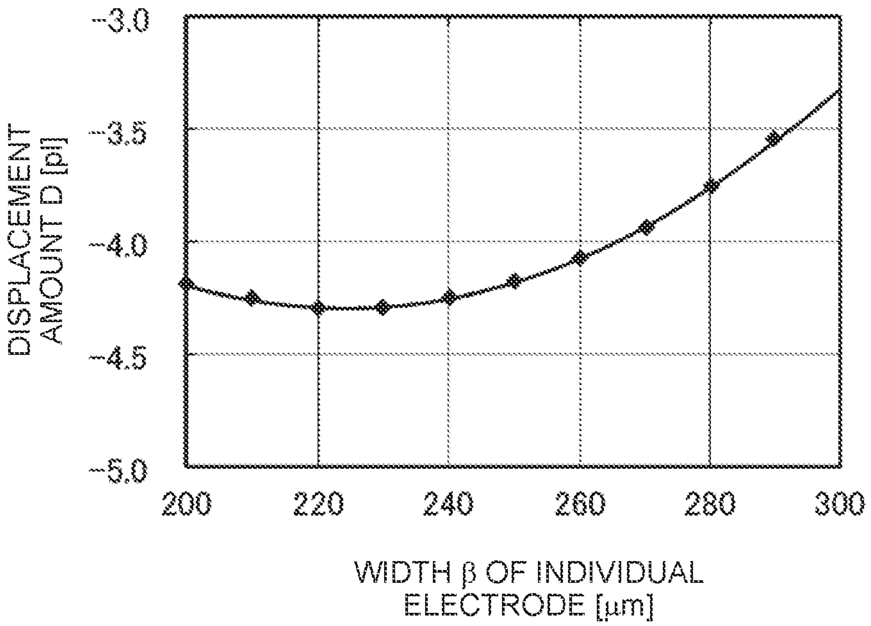
FIG. 6 is a graph illustrative of a simulation result of the displacement amount (displacement volume) of a piezoelectric element as obtained when the width of an individual electrode is changed.

The present inventors have found out that the displacement amount D of the piezoelectric element 12X changes depending on the width α of the pressure chamber 22 and the width β of the individual electrode 12*d*. Then, the present inventors have found out the correlation between the displacement amount D of the piezoelectric element 12X and the width β of the individual electrode 12*d* by means of the simulation. FIG. 6 depicts a simulation result of the displacement amount D (displacement volume) of the piezoelectric element 12X obtained when the width β of the individual electrode 12*d* is changed. It is assumed that the width β of the individual electrode 12*d* is not more than the width & of the pressure chamber 22. It is assumed that the width α of the pressure chamber 22 is 300 μm, the length of the pressure chamber 22 (length in the scanning direction) is 800 μm, the thickness of the vibration plate 12*a* is 11 μm, the thickness of the piezoelectric layer 12*b* is 18 μm, and the driving electric potential is 20 V.

As depicted in FIG. 6, the displacement amount D of the piezoelectric element 12X is maximized when the width β of the individual electrode 12*d* is 230 μm. Then, the smaller the width β of the individual electrode 12*d* as compared with 230 μm is, the more lowered the displacement amount D of the piezoelectric element 12X is. Further, the larger the width β of the individual electrode 12*d* as compared with 230 μm is, the more lowered the displacement amount D of the piezoelectric element 12X is. That is, the displacement amount D of the piezoelectric element 12X is lowered not only when the width β of the individual electrode 12*d* is excessively small with respect to the width α of the pressure chamber 22 as a matter of course, but also when the width β of the individual electrode 12*d* is excessively large.

Further, the present inventors have changed the set values of the width α of the pressure chamber 22, the length of the pressure chamber 22 (length in the scanning direction), the thickness of the vibration plate 12*a*, and the thickness of the piezoelectric layer 12*b* respectively to calculate the width β (optimum width) of the individual electrode 12*d* at which the displacement amount D of the piezoelectric element 12X is maximized. As a result, it has been found out that the optimum width of the individual electrode 12*d* is irrelevant to the length of the pressure chamber 22 (length in the scanning direction), the thickness of the vibration plate 12*a*, and the thickness of the piezoelectric layer 12*b*, but the optimum width of the individual electrode 12*d* has the correlation with respect to the width α of the pressure chamber 22. Note that the width α of the pressure chamber 22 is changed in a range of not less than 250 μm and not more than 450 μm.

Figure 7:
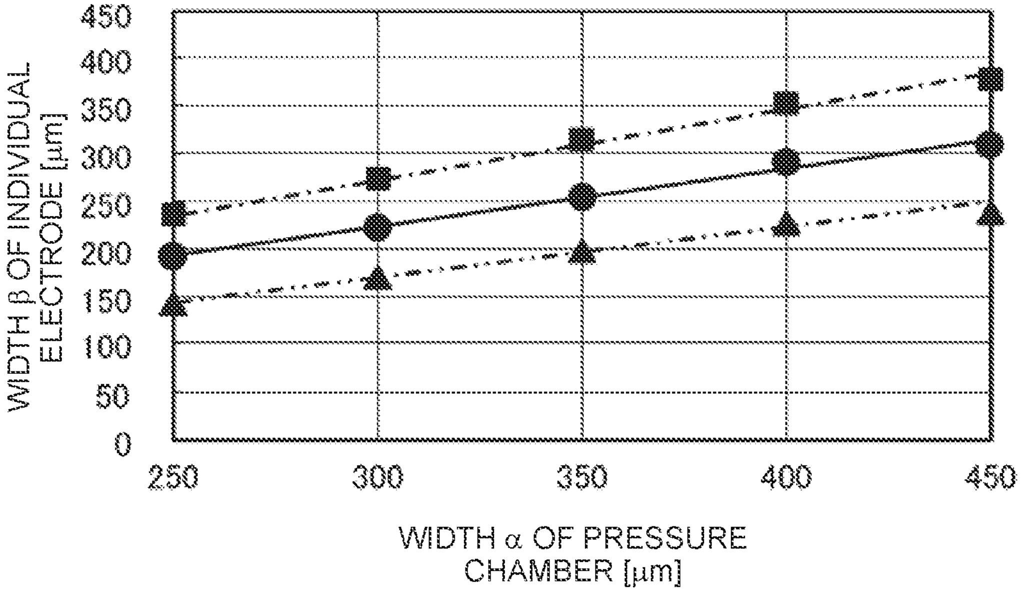
FIG. 7 is a graph illustrative of a relationship between the width of the pressure chamber and the width of the individual electrode at which the displacement amount of the piezoelectric element is maximized and a relationship between the width of the pressure chamber and the width of the individual electrode at which the displacement amount of the piezoelectric element is 90%.
Figure 8:
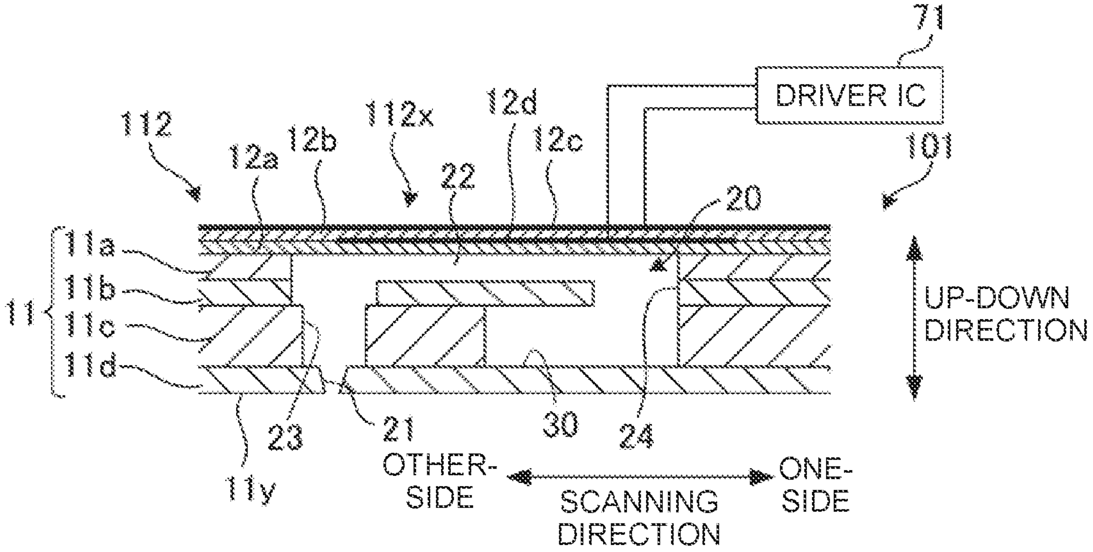
FIG. 8 is a sectional view corresponding to FIG. 4 illustrative of an ink-jet head 101.

With reference to FIG. 7, black circles indicate a simulation result in relation to the width α of the pressure chamber 22 and the optimum width of the individual electrode 12*d.*

$$\beta=0.6217\alpha+36.443 \qquad \text{Expression 1}$$

As depicted in Expression 1, the width α of the pressure chamber 22 and the width β of the individual electrode 12*d* are in such a relationship that the displacement amount D of the piezoelectric element 12X can be maximized (see a solid line depicted in FIG. 7). As described above, the width α of the pressure chamber 22 and the width β of the individual electrode 12*d* of this embodiment fulfill the relationship of Expression 1 described above.

Further, the width α of the pressure chamber 22 is changed to calculate the allowable width of the width β of the individual electrode 12*d* at which the displacement amount D of the piezoelectric element 12X is 90% of the maximum value. With reference to FIG. 7, black squares indicate a simulation result in relation to the width α of the pressure chamber 22 and the allowable width of the width β of the individual electrode 12*d* (not less than the optimum width), and black triangles indicate a simulation result in relation to the width α of the pressure chamber 22 and the allowable width of the width β of the individual electrode 12*d* (not more than the optimum width).

As depicted by an alternate long and short dash line in FIG. 7, such a relationship is given that the displacement amount D of the piezoelectric element 12X can be 90% of the maximum value by the width α of the pressure chamber 22 and the width β of the individual electrode 12*d* (not less than the optimum width) when $\beta=0.7326\alpha+54.409$ is given. Further, as depicted by an alternate long and two short dashes line in FIG. 7, such a relationship is given that the displacement amount D of the piezoelectric element 12X can be 90% of the maximum value by the width α of the pressure chamber 22 and the width β of the individual electrode 12*d* (not more than the optimum width) when $\beta=0.5107\alpha+18.476$ is given.

According to the above, when the width α of the pressure chamber 22 and the width β of the individual electrode 12*d* fulfill the following relationship of Expression 2, it is possible to sufficiently increase the displacement amount D of the piezoelectric element 12X.

$$0.5107\alpha+18.476<\beta<0.7326\alpha+54.409. \qquad \text{Expression 2}$$

Note that each of the plurality of pressure chambers 22 and the individual electrode 12*d* provided for the pressure chamber 22 of the plurality of piezoelectric elements 12X fulfill the relationship of Expression 1 described above. That is, with reference to FIG. 5, the width of the individual electrode 12*d* of the piezoelectric element 12X provided for the pressure chamber 22 having the width $\alpha 1$ positioned on the left side is the width $\beta 1$. Further, the width of the individual electrode 12*d* of the piezoelectric element 12X provided for the pressure chamber 22 having the width $\alpha 2$ positioned on the right side is the width $\beta 2$. In this context, the width $\alpha 1$ of the pressure chamber 22 disposed on the left side and the width $\beta 1$ of the individual electrode 12*d* fulfill the relationship of Expression 1 described above. Further, the width $\alpha 2$ of the pressure chamber 22 disposed on the right side and the width $\beta 2$ of the individual electrode 12*d* fulfill the relationship of Expression 1 described above.

Feature of First Embodiment

As described above, the ink-jet head 1 of this embodiment is provided with the channel unit 11 which is formed with the channels including the nozzles 21 and the pressure chambers 22 communicated with the nozzles 21, and the piezoelectric actuator 12 which is stacked on the upper surface 11*x* of the channel unit 11, the piezoelectric actuator 12 being provided with the piezoelectric elements 12X for applying the pressure to the ink contained in the pressure chambers 22 at the portions overlapped with the pressure chambers 22 in relation to the up-down direction. The piezoelectric element 12X has the vibration plate 12*a*, the piezoelectric layer 12*b* which is stacked on the upper surface of the vibration plate 12*a*, the common electrode 12*c* which is arranged between the vibration plate 12*a* and the piezoelectric layer 12*b* and which is maintained at the ground electric potential, and the individual electrode 12*d* which is arranged on the upper surface of the piezoelectric layer 12*b* and which is selectively applied with the ground electric potential and the driving electric potential. The pressure chamber 22 and the individual electrode 12*d* have the shapes which are long in the scanning direction respectively. Expression 1 ($\beta=0.6217\alpha+36.443$) is fulfilled assuming that $\alpha$ represents the width of the pressure chamber 22 (length in the conveyance direction) and $\beta$ represents the width of the individual electrode 12*d* (length in the conveyance direction).

The present inventors have found out that the displacement amount D of the piezoelectric element 12X changes depending on the width $\alpha$ of the pressure chamber 22 and the width $\beta$ of the individual electrode 12*d*. According to the ink-jet head 1 of this embodiment, as clarified from the simulation result described above, the width $\alpha$ of the pressure chamber 22 and the width $\beta$ of the individual electrode 12*d* are in such a relationship that the displacement amount D of the piezoelectric element 12X can be maximized. Therefore, it is possible to define the size or dimension which makes it possible to maximize the displacement amount D of the piezoelectric element 12X without excessively decreasing or excessively increasing the width $\beta$ of the individual electrode 12*d* with respect to the width $\alpha$ of the pressure chamber 22. Thus, the ink-jet head 1 of this embodiment contributes to the miniaturization of the apparatus by decreasing the area (square measure) of the individual electrode 12*d*. Further, the ink-jet head 1 of this embodiment contributes to the suppression of the decrease in the displacement amount of the piezoelectric element 12X.

Further, in the case of the ink-jet head 1 of the embodiment described above, the common electrode 12*c* is maintained at 0 V. Therefore, it is easy to control the voltage.

Further, in the case of the ink-jet head 1 of the embodiment described above, each of the pressure chamber 22 and the individual electrode 12*d* has the rectangular or oblong shape as viewed in a top view. When the pressure chamber 22 and the individual electrode 12*d* are rectangular or oblong, the displacement amount D of the piezoelectric element 12X is large as compared with any pressure chamber and any individual electrode each having any other shape (for example, a rhombus) in which the length in the longitudinal direction and the length in the transverse direction are, for example, the same as those of the pressure chamber 22 and the individual electrode 12*d* which are rectangular or oblong.

Additionally, in the case of the ink-jet head 1 of the embodiment described above, each of the plurality of pressure chambers 22 and the individual electrode 12*d* provided for the concerning pressure chamber 22 of the plurality of piezoelectric elements 12X fulfill the relationship of Expression 1 described above. Therefore, it is possible to preferably set the width $\beta$ of the individual electrode 12*d* possessed by the piezoelectric element 12X corresponding to each of the pressure chambers 22 depending on the width $\alpha$ of each of the pressure chambers 22.

SECOND EMBODIMENT

Next, an explanation will be made about an ink-jet head 101 according to a second embodiment of the present disclosure. In the case of the ink-jet head 101 of this embodiment, the configuration of a piezoelectric actuator 112 (piezoelectric element 112X) is different from that of the first embodiment. In the following description, the constitutive parts or components, which are common to those of the first embodiment, are designated by the same reference numerals, any explanation of which will be appropriately omitted.

In the piezoelectric element 12X of the first embodiment, the common electrode 12*c* is arranged between the vibration plate 12*a* and the piezoelectric layer 12*b*, and the individual electrode 12*d* is arranged on the upper surface of the piezoelectric layer 12*b*. On the other hand, in the piezoelectric element 112X of this embodiment, the common electrode 12*c* is arranged on the upper surface of the piezoelectric layer 12*b*, and the individual electrode 12*d* is arranged between the vibration plate 12*a* and the piezoelectric layer 12*b*.

Further, in this embodiment, each of the portions of the piezoelectric layer 12*b*, which is interposed by the common electrode 12*c* and each of the individual electrodes 12*d*, is polarized in the upward direction. Therefore, when the electric potential of the individual electrode 12*d* is switched from the ground electric potential to the driving electric potential in each of the piezoelectric elements 112X of the piezoelectric actuator 112, the electric field, which is in the upward direction that is the same as the polarization direction, is generated at the portion of the piezoelectric layer 12*b* interposed by the concerning electrodes in accordance with the electric potential difference between the individual electrode 12*d* and the common electrode 12*c* which is maintained at the ground electric potential. Owing to this electric field, the foregoing portion of the piezoelectric layer 12*b* is shrunk in the horizontal direction to cause the deformation so that the piezoelectric element 112X protrudes toward the pressure chamber 22.

Feature of Second Embodiment

The ink-jet head 101 of this embodiment contributes to the miniaturization of the apparatus by decreasing the area (square measure) of the individual electrode 12*d* in the same manner as the first embodiment. Further, the ink-jet head 101 of this embodiment contributes to the suppression of the decrease in the displacement amount D of the piezoelectric element 112X.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiments described above, such a case has been explained that the width $\alpha$ of the pressure chamber 22 and the width $\beta$ of the individual electrode 12*d* fulfill the relationship of Expression 1 described above, and the relationship is provided such that the displacement amount D of the piezoelectric element 12X can be maximized. However, there is no limitation thereto. That is, the width $\alpha$ of the pressure chamber 22 and the width $\beta$ of the individual electrode 12*d* may fulfill Expression 2 described above, and the relationship may be provided such that the displacement amount D of the piezoelectric element 12X can be not less than 90% of the maximum value.

Further, in the embodiments described above, such a case has been explained that the common electrode 12*c* is maintained at the ground electric potential, and any one of the ground electric potential and the predetermined driving electric potential higher than the ground electric potential is selectively applied to the individual electrode 12*d*. However, there is no limitation thereto. Assuming that the first electric potential is the lower electric potential of the two types of the electric potentials selectively applied to the individual electrode 12*s* and the second electric potential is the higher electric potential, the common electrode 12*c* may be maintained at the third electric potential which is not less than the first electric potential and not more than the second electric potential. That is, for example, the common electrode 12*c* may be maintained at the third electric potential of 10 V, and any one of the first electric potential of 0 V and the second electric potential of 20 V may be selectively applied to the individual electrode 12*d*.

Further, in the embodiments described above, such a case has been explained that each of the pressure chamber 22 and the individual electrode 12*d* has the rectangular or oblong shape as viewed in a top view. However, there is no limitation thereto. The pressure chamber 22 and the individual electrode 12*d* may have shapes which are long in the same direction, and the pressure chamber 22 and the individual electrode 12*d* may be, for example, ellipses or rhombuses. Further, it is not necessarily indispensable that the pressure chamber 22 and the individual electrode 12*d* have the same shape. For example, one may be an oblong or rectangle, and the other may be an ellipse.

Further, in the embodiments described above, such a case has been explained that the plurality of pressure chambers 22 are aligned in the transverse direction in the channel unit 11. However, there is no limitation thereto. It is allowable that the channel unit 11 is provided with at least one pressure chamber 22.

The recording system of the printer 100 is not limited to the serial system. It is also allowable to adopt the line system which is lengthy in the widthwise direction of the recording paper P, wherein the ink is discharged from nozzles of a head having a fixed position.

The liquid, which is discharged from the nozzle 21, is not limited to the ink. The liquid may be any arbitrary liquid (for example, a process liquid or the like for coagulating or depositing the component contained in the ink). Further, the discharge target is not limited to the recording paper P. The discharge target may be, for example, cloth, substrate or the like.

What is claimed is:

1. A liquid discharge head comprising:

a channel unit including a channel, the channel including a nozzle and a pressure chamber communicated with the nozzle; and a piezoelectric actuator stacked on the channel unit and arranged at a portion overlapped with the pressure chamber in a stacking direction of the channel unit and the piezoelectric actuator, the piezoelectric actuator including a piezoelectric element configured to apply a pressure to a liquid contained in the pressure chamber, the piezoelectric element including:

a piezoelectric layer;

a constant electric potential electrode arranged between the piezoelectric layer and the channel unit; and a driving electrode arranged on a surface of the piezoelectric layer opposite to the constant electric potential electrode, the driving electrode being configured to be selectively applied with a first electric potential and a second electric potential that is higher than the first electric potential, wherein the constant electric potential electrode is configured to be maintained at a third electric potential which is not less than the first electric potential and which is not more than the second electric potential, the pressure chamber and the driving electrode have shapes which are elongated in one direction orthogonal to the stacking direction respectively, and a relational expression of $0.5107\alpha+18.476<\beta<0.7326\alpha+54.409$ is fulfilled assuming that $\alpha$ represents a length in a transverse direction orthogonal to both of the one direction and the stacking direction of the pressure chamber and $\beta$ represents a length in the transverse direction of the driving electrode.

2. The liquid discharge head according to claim 1, wherein the third electric potential is 0 V.

3. The liquid discharge head according to claim 1, wherein each of the pressure chamber and the driving electrode has a rectangular shape as viewed in the stacking direction.

4. The liquid discharge head according to claim 1, wherein a relationship of $\beta=0.6217\alpha+36.443$ is fulfilled.

5. The liquid discharge head according to claim 1, wherein the channel unit includes a plurality of pressure chambers aligned in the transverse direction in the channel unit, the pressure chamber being one of the plurality of pressure chambers, the piezoelectric actuator includes a plurality of piezoelectric elements corresponding to the plurality of pressure chambers, respectively, the piezoelectric element being one of the plurality of piezoelectric elements, and the relational expression of $0.5107\alpha+18.476<\beta<0.7326\alpha+54.409$ is fulfilled by each of the plurality of pressure chambers and corresponding one of driving electrodes.

6. A liquid discharge head comprising:

a channel unit including a channel, the channel including a nozzle and a pressure chamber communicated with the nozzle; and a piezoelectric actuator stacked on the channel unit and arranged at a portion overlapped with the pressure chamber in a stacking direction of the channel unit and the piezoelectric actuator, the piezoelectric actuator including a piezoelectric element configured to apply a pressure to a liquid contained in the pressure chamber, the piezoelectric element including:

a piezoelectric layer;

a driving electrode arranged between the piezoelectric layer and the channel unit, the driving electrode being configured to be selectively applied with a first electric potential and a second electric potential that is higher than the first electric potential; and a constant electric potential electrode arranged on a surface of the piezoelectric layer opposite to the driving electrode, wherein the constant electric potential electrode is configured to be maintained at a third electric potential which is not less than the first electric potential and which is not more than the second electric potential, the pressure chamber and the driving electrode have shapes which are elongated in one direction orthogonal to the stacking direction respectively, and a relational expression of $0.5107\alpha+18.476<\beta<0.7326\alpha+54.409$ is fulfilled assuming that $\alpha$ represents a length in a transverse direction orthogonal to both of the one direction and the stacking direction of the pressure chamber and $\beta$ represents a length in the transverse direction of the driving electrode.

7. The liquid discharge head according to claim 6, wherein the third electric potential is 0 V.

8. The liquid discharge head according to claim 6, wherein each of the pressure chamber and the driving electrode has a rectangular shape as viewed in the stacking direction.

9. The liquid discharge head according to claim 6, wherein a relationship of $\beta=0.6217\alpha+36.443$ is fulfilled.

10. The liquid discharge head according to claim 6, wherein the channel unit includes a plurality of pressure chambers aligned in the transverse direction in the channel unit, the pressure chamber being one of the plurality of pressure chambers, the piezoelectric actuator includes a plurality of piezoelectric elements corresponding to the plurality of pressure chambers, respectively, the piezoelectric element being one of the plurality of piezoelectric elements, and the relational expression of $0.5107\alpha+18.476<\beta<0.7326\alpha+54.409$ is fulfilled by each of the plurality of pressure chambers and corresponding one of driving electrodes.

* * * * *